United States Patent
Tate

[15] 3,704,751
[45] Dec. 5, 1972

[54] METHOD FOR STIMULATING WELL PRODUCTION

[72] Inventor: Jack F. Tate, Houston, Tex.

[73] Assignee: Texaco Inc., New York, N.Y.

[22] Filed: June 21, 1971

[21] Appl. No.: 155,309

[52] U.S. Cl. ............... 166/307, 166/308, 252/8.55 C, 252/8.55 B
[51] Int. Cl. ............................................. E21b 43/27
[58] Field of Search ............... 166/307, 308, 281, 271; 252/8.55 B, 8.55 C, 8.55 E

[56] References Cited

UNITED STATES PATENTS

| | | | |
|---|---|---|---|
| 2,802,531 | 8/1957 | Cardwell et al. | 166/307 X |
| 3,021,279 | 2/1962 | Scanley | 252/8.55 C |
| 3,233,672 | 2/1966 | Carpenter | 166/307 |
| 3,429,824 | 2/1969 | Tate | 252/8.55 B X |
| 3,441,085 | 4/1969 | Gidley | 166/307 |
| 3,488,289 | 1/1970 | Tate | 252/8.55 B X |
| 3,502,587 | 3/1970 | Stanford et al. | 252/8.55 B X |
| 3,557,001 | 1/1971 | Stanford et al. | 252/8.55 B X |
| 3,584,687 | 6/1971 | Stanford et al. | 252/8.55 B X |

*Primary Examiner*—Stephen J. Novosad
*Attorney*—Thomas H. Whaley et al.

[57] ABSTRACT

The production of hydrocarbons from a subterranean hydrocarbon-bearing formation containing acid-soluble components, such as one composed at least in part of dolomite or limestone, is stimulated by injecting into the formation a composition comprising an aqueous solution of a mineral acid having dissolved therein a phosphate ester of prescribed formula. The elimination of plugging of capillary openings within the formation and mineral scale deposition on production equipment due to post-precipitation of dissolved salts subsequent to acidization by means of the said phosphate ester results in a substantial improvement in hydrocarbon recovery.

16 Claims, No Drawings

METHOD FOR STIMULATING WELL PRODUCTION

FIELD OF THE INVENTION

This invention relates to a method for stimulating the production of fluids from earthen formations. More particularly, this invention relates to a method in which the productivity of a hydrocarbon-bearing formation containing acid-soluble components and with or without water-sensitive clays or shales is improved upon treatment of the formation with an aqueous solution of a mineral acid and a phosphate ester of prescribed formula, said phosphate ester effecting the elimination of plugging of capillary openings due to post-precipitation of dissolved salts subsequent to the acidization as well as effecting elimination of mineral scale on production equipment such as pumps, tubing, etc. caused by such precipitation.

DESCRIPTION OF THE PRIOR ART

The technique of increasing the permeability of a subterranean hydrocarbon-bearing formation and of removing obstructing acid-soluble mineral scale for the purpose of stimulating the production of fluids therefrom has long been practiced in the art. One such method commonly employed is known as acidizing which is widely utilized in treating subsurface acid-soluble geological formations, e.g., limestone, dolomite, etc. The technique is not limited to application in formations of high acid solubility. Sandstone and gypsum-containing formations may require acidization if the produced water is unstable with respect to $CaCO_3$. In the usual well-acidizing procedure, a non-oxidizing mineral acid is introduced into the well and under sufficient pressure is forced into the adjacent subterranean formation where it reacts with formation components, and deposited mineral scale, particularly the carbonates such as calcium carbonate, magnesium carbonate, etc., to form the respective salt of the acid, carbon dioxide and water. The usual mineral acid employed in such acidization procedures is hydrochloric acid.

During the acidizing process passageways for fluid flow are created or existing passageways therein are enlarged thus stimulating the production of oil, water, brines and various gases. If desired, the acidization may be carried out at an injection pressure sufficiently great to create fractures in the strata or formation which has the desired advantage of opening up passageways into the formation along which the acid can travel to more remote areas from the well bore. The salt formed upon neutralization of the acid is extensively water soluble and is readily removed by reverse flow from the formation via the well bore.

There are, however, troublesome complications attending the use of hydrochloric acid or other similar nonoxidizing mineral acids. In the acidizing process, the following primary beneficial reaction occurs: $CaCO_3 + 2HCl \longrightarrow CaCl_2 + H_2O + CO_2$. Under the higher pressures required to conduct an acidization, the $CO_2$ is dissolved in the reaction mixture consisting of spent acid and connate water: $CO_2 + H_2O \leftrightarrow H_2CO_3 \leftrightarrow H^+ + HCO_3^- \leftrightarrow 2H^+ + CO_3^-$. The equilibria may be summarized and written: $Ca(HCO_3)_2 \leftrightarrow CaCO_3 +$

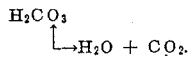

After acidization is completed, the well is often back-flowed in the case of a water injection well (in order to clean out formation and tubing) and put back on production in the case of a producing oil or gas well. In both cases, pressure diminishes, $CO_2$ breaks out of solution, inducing $CaCO_3$ to precipitate. Such precipitation, when it occurs within the capillaries of a tight formation or on the tubing or annulus as a mineral scale, can severely lessen production or injection rate by plugging such capillaries or well equipment.

It is known that molecularly dehydrated polyphosphates are effective in retarding $CaCO_3$ precipitation. These polyphosphates are unsatisfactory in the method of the present invention because they undergo rapid hydrolysis in the presence of the mineral acid component required in the method of the present invention. As a result, the scale inhibiting properties of these polyphosphates are destroyed. In addition, one hydrolytic reaction product, the phosphate ion ($PO_4^{-3}$), can precipitate with calcium $^{+2}$ or barium $^{+2}$ ions present in the produced water, causing additional plugging or scale deposition, further aggravating the problem. The so-called "glassy" phosphates are known scale inhibitors. However, these glassy phosphates are unsatisfactory because of their slight solubility in acidic media and the tendency to form objectionable hydrolytic reaction products.

It is also known to employ various organic polymers to prevent the precipitation of mineral salts. Many of these polymeric materials are unstable in mineral acids. In such acidic media they undergo spontaneous depolymerization to an ineffective species. A representative polymeric material which undergoes such hydrolysis in the presence of acids is polyacrylamide. In addition, this polymer has a further disadvantage in that it is unstable in aqueous media at temperatures of about 300° F. and upwards. Many wells that are being treated by the method of the present invention have bottom hole temperatures of 250°-300° F. or higher.

The chemically altered natural polymers and natural polymers themselves, are effective inhibitors to prevent the precipitation of mineral salts. However, many of these materials such as sodium carboxymethylcellulose precipitate or decompose in the presence of mineral acids. Other known sequestering agents such as citric or tartaric acids, and/or complexing agents such as ethylenediaminetetraacetic acid and its water-soluble salts are known inhibitors to prevent the deposition of boiler scale in aqueous media. However, such materials are not applicable in the method of the present invention because they are not appreciably surface active and do not adsorb on the formation face.

It is therefore, the principal object of the present invention to overcome the defects of the prior art in acidizing fluid bearing formations such as hydrocarbon-bearing formations, etc., by providing a method of acidization employing the novel composition of this invention.

SUMMARY OF THE INVENTION

This invention encompasses and includes a method of increasing the production of fluids from a subterranean fluid-bearing formation having present acid-soluble components comprising injecting down the well bore to said formation and therefrom into said formation under a pressure greater than the formation pressure an aqueous acidizing composition hereinafter more fully described, maintaining said composition in contact with the formation strata for a time sufficient for the acid to chemically react with the acid-soluble components of the formation and/or acid-soluble mineral scale deposited on production equipment to etch or enlarge passageways through the strata and remove the scale and thereby increasing substantially the flow capacity of the said subterranean formation.

The novel aqueous acidizing composition of this invention comprises an aqueous solution of a non-oxidizing mineral acid, such as hydrochloric or sulfuric acid, having dissolved therein a phosphate ester of prescribed formula. The concentration of acid present in the subject composition is such that it is capable of reacting with the acid-soluble components of the fluid-bearing strata.

DETAILED DESCRIPTION OF THE INVENTION

In its broadest embodiment the method of the present invention comprises introducing into a subsurface formation containing acid-soluble components an aqueous acid solution of a phosphate ester of prescribed formula wherein the said solution is maintained in contact with the formation for a time sufficient to chemically react with the formation and/or acid-soluble mineral scale deposited on production equipment so as to increase substantially the flow capabilities of the formation and to release carbon dioxide concomitantly whereby a beneficial effect due to the mutual miscibility of carbon dioxide in the fluid phases is realized as a reduction in viscosity and retentive capillary forces, while another beneficial effect is realized in the form of increased formation energy, due to the pressure generated by the released carbon dioxide.

An advantage resulting from the employment of the method of this invention in acidizing fluid-bearing formations is that the post-precipitation of dissolved carbonates is prevented or materially decreased. Such post-precipitation occurs because of the nature of the dissolution reaction:

$$Ca(HCO_3)_2 \leftrightarrow CaCO_3 + H_2O + CO_2 \uparrow.$$

When pressure is released so that spent reaction products from the acidization process can be removed, carbon dioxide gas can break out of solution, causing post-precipitation of calcium carbonate. Such post-precipitation occurring within the formation matrix near the bore hole can decrease permeability by plugging the formation capillaries, particularly those near the well bore, and result in a lower production rate. Furthermore, such post-precipitation can occur in the tubing or annulus of the well itself and manifest itself as mineral scale, reducing their diameter(s) and resulting in a lower production rate.

The phosphate ester useful in preparing the novel composition of this invention has the general formula

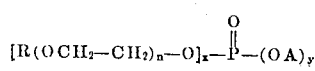

$$[R(OCH_2-CH_2)_n-O]_x-\overset{O}{\underset{\|}{P}}-(OA)_y$$

wherein R is a $C_6$—$C_{12}$ alkylphenyl radical or a $C_{12}$—$C_{18}$ alkyl radical, A is hydrogen or an alkali metal, n is a number from 1 to 20, both x and y are 1 or 2 and the sum of x and y is 3, said ester having a molecular weight in the range of from about 500 to 1000.

The phosphate esters of the prescribed formula can be prepared in a known manner such as for example by ethoxylation of alkylphenols and alkanols and phosphorylation of ethoxylated hydroxy compounds. Representative alkylphenols include the $C_6$—$C_{12}$ straight and branched chain alkylphenols such as the hexylphenols, octylphenols, nonylphenols, decylphenols and dodecylphenols and mixtures thereof. Representative alkanols include dodecanol, tridecanol, hexadecanol, octadecanol and mixtures of such alkanols. Mixtures of these alkylphenols and alkanols can be also satisfactorily used in the present invention such as a mixture of nonylphenol and tridecanol. The number of ethoxy groups in the ethoxylated alkylphenol or alkanol portion of the ester may vary from 1 to about 20. A preferred number is from about 6 to about 10. Formation of the phosphate esters of the present invention from the ethoxylated alkyphenols and alkanols can be carried out by known methods such as described in J. Am. Ch. Soc., 77, 5351; 81, 2094; and Chemiker-Ztg., 81, 72–75.

The corresponding salts of the phosphate esters can be prepared by neutralization of the esters with a base such as caustic soda or potassium hydroxide, for example.

A preferred phosphate ester is an admixture of 40–60 percent by weight of the phosphate monoester and 60–40 percent by weight of the phosphate diester. A particularly preferred composition comprises about 55 percent by weight of nonylphenoxypolyethoxyethyl phosphate and about 45 percent by weight of di(nonylphenoxypolyethoxyethyl) phosphate wherein the polyethoxy moiety in each ester contains an average of about 9 ethylene oxide groups which corresponds to the 10 ethylene oxide groups in the original ethoxylated hydroxy compound.

Another preferred mixed ethoxylated nonylphenol phosphate ester is a mixture of 40–60 percent monoester and 60–40 percent diester wherein each ester contains about 5 ethylene oxide groups in each polyethoxy moiety.

The preferred monoester derived from alkanol is a $C_{12}$—$C_{18}$ alkoxypolyethoxyalkyl phosphate wherein the alkoxy group is tridecoxy and the polyethoxy moiety is from 5 to 9 ethylene oxide groups. The corresponding diester contains similar esterifying groups and can be used in admixture with the aforesaid monoester.

Preferably, the aqueous acid composition of this invention is one comprising an aqueous solution which may include brine and about 3 to about 30 percent, preferably 5–28 percent, by weight of a non-oxidizing mineral acid, and which contains dissolved therein between about 0.1 to about 2.5 percent, preferably 0.3–1.5 percent by weight of the phosphate ester based on the total solution weight.

Generally, the aqueous solution will contain an inhibitor to prevent or greatly reduce the corrosive attack of the acid on metal. Any of a wide variety of compounds known in the art and employed for this purpose can be used, e.g., certain compounds of arsenic, nitrogen or sulfur as described by Grebe et al in U.S. Pat. No. 1,877,504 or a rosin amine type as described in U.S. Pat. No. 2,758,970. The amount of the inhibitor utilized is not highly critical and it may be varied widely. Usually this amount is defined as a small but effective amount, e.g., from 0.02 to about 2.0 percent by weight.

In carrying out the method of this invention, a solution of from about 3 to about 30 percent by weight of the non-oxidizing mineral acid dissolved in water is first prepared. An inhibitor to prevent corrosion of acid on the metal equipment associated with the well is usually added with mixing in the next step. The phosphate ester in an amount within the stated concentration range is then admixed with the aqueous acid solution. The thus-prepared composition is forced, usually via a suitable pumping system, down the well bore and into contact with the production equipment and formation to be treated. As those skilled in the art will readily understand, the pressure employed is determined by the nature of the formation, viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution containing the phosphate ester of prescribed type. Generally, it is advisable to allow the aqueous acid solution to remain in contact with the formation and production equipment until the acid therein has been substantially depleted by reaction with the acid-soluble components of the formation and the deposited scale. After this, the substantially spent treating solution is reversed out of the well, i.e., it is it is allowed to flow back out or to be pumped out of the formation. Further, as those skilled in the art will understand, the concentration of the phosphate ester and acid component should be chosen to provide an acidizing fluid of the desired rheological properties.

In the method of this invention, the phosphate ester component of the composition provides means whereby calcium ions having tendencies to precipitate as $CaCO_3$ from a supersaturated solution of $CaCO_3$ or $Ca(HCO_3)_2$ that is produced by the reaction of acid component with the formation, or previously deposited acid-soluble mineral scale combine with the phosphoric acid moiety to form a highly stable complex therein so that solid calcium carbonate does not precipitate from the spent treating solution. This binding up of the aforementioned calcium ions from weakly ionizable compounds permits the formed calcium-phosphoric acid ester complex to remain dissolved in the treating solution and pass through the formation pores and production equipment.

Further, the phosphate ester component of the composition provides means whereby the nucleation and growth of the solid itself is thwarted, so that solid calcium carbonate does not precipitate from the spent treating solution.

Finally, the phosphate ester component of the composition provides means whereby continuous protection against post-precipitation of $CaCO_3$, is obtained for a considerable period of time subsequent to treatment due to continuous slow desorption of the component from the formation surfaces. In contrast, use of surfactants having merely dispersant and suspending properties and not possessing the capability of molecularly binding up these produced calcium ions or thwarting the nucleation and growth of the solid $CaCO_3$ will permit deposition of calcium carbonate to occur from such treating solution with the likelihood of plugging the formation passageways and production equipment during subsequent recovery of desirable formation hydrocarbons therethrough.

Following is a description by way of example of the method of the invention.

EXAMPLE I

A producing well in East Texas was treated in the following manner.

A treating mixture was prepared by mixing 10 barrels of salt water containing about 26 percent sodium chloride and 12 barrels of 15 percent by weight aqueous hydrochloric acid containing 0.5 barrel of a mixture of 21.55 wt. percent of the phosphate ester sold under the trade name "Alkapent M 100," 2.16 wt. percent caustic (100 percent) and 79.29 percent by weight of water. The ester is a mixed ester consisting essentially of 50–60 percent by weight of a branched chain nonylphenoxypolyethoxyethyl phosphate and 30–40 percent by weight of di(branched chain nonylphenoxypolyethoxyethyl) phosphate, the average polyethoxy group moiety being 9, the balance comprising up to 10 percent of unreacted polyethoxynonylphenol and 2–4 percent phosphoric acid. The phosphorous content was 4.0–4.3 percent by weight and the ester required about 1.3 and 2.4 milliequivalents of base to pH 5.5 and 9.5, respectively. The final mixture (22 barrels) contained 39.35 pounds of " Alkapent M-100," (0.45 wt. percent), 648.1 pounds hydrochloric acid (7.44 wt. percent) and the balance salt water containing a little caustic.

The treating mixture was squeezed into the formation at a rate of about ½ BPM at 450 psig. The shut-in tubing pressure was 450 psig which bled down to zero in a short time. The well was then returned to production.

EXAMPLE II

A treating mixture was prepared from 10 barrels of salt water (2.6 percent sodium chloride) and 12 barrels of 15% by weight aqueous hydrochloric acid solution containing 1 barrel of the same mixture and the same phosphate ester of Example I. The treating mixture comprising 78.7 pounds of Alkapent M-100, (0.905 percent), 620 pounds of hydrochloric acid, (7.13 percent), the balance salt water containing a little caustic, was injected into the producing formation in the manner approximating that used in Example I. Thereafter 20 barrels of water were used to overflush the treated formation by injection down the tubing, followed by injection of 10 barrels of water down the casing. The well was then returned to production.

EXAMPLE III

The treating mixture of Example II was injected into another producing formation. An overflush of 10 barrels of water was used to force the treating mixture into the formation by injection down the tubing. The well was then returned to production.

The following table shows the production from these wells before the described treatment and for a number of months subsequent thereto:

Average Monthly Production Bbls/Mo.

| Well of Example | I | II | III |
| --- | --- | --- | --- |
| Before Treatment | 120 | 30 | 30 |
| 1 mo. after treatment | | 240 | 120 |
| 2 mo. after treatment | | | 100 |
| 3 mo. after treatment | | 236 | |
| 4 mo. after treatment | 254 | 241 | |
| 5 mo. after treatment | 300 | 237 | |
| 6 mo. after treatment | 284 | 241 | |
| 7 mo. after treatment | 277 | 208 | |

The data in the above table show that the method of the present invention is effective in stimulating and/or restoring the production of petroleum fluids from underground formations.

Obviously, many modifications and variations of the invention as hereinabove set forth may be made without departing from the spirit and scope thereof, and therefore only such limitations should be imposed as are indicated in the appended claims.

I claim:

1. A method of increasing the production of fluids from a subterranean fluid-bearing formation having present therein acid-soluble components comprising injecting down the well bore penetrating said formation and injecting therefrom into said formation under a pressure greater than the formation pressure, an aqueous solution containing from about 3 to 30 percent by weight of a mineral acid having dissolved therein from about 0.1 to 2.5 percent by weight of the solution of a phosphate ester having the general formula

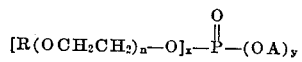

wherein R is a $C_6$—$C_{12}$ alkylphenyl radical or a $C_{12}$—$C_{18}$ alkyl radical, A is hydrogen or an alkali metal, $n$ is a number from 1 to 20, both $x$ and $y$ are 1 and 2 and the sum of $x$ and $y$ is 3, said ester having a molecular weight in the range of from about 500 to about 1000, maintaining said solution in contact with the formation and production equipment for a time sufficient for the acid to chemically react with the acid-soluble components of the formation to etch passageways therethrough thereby increasing substantially the flow capacity of the said subterranean formation.

2. Method as claimed in claim 1 wherein said ester is a monoester of phosphoric acid esterified with an ethoxylated nonylphenol containing from about six to 10 ethoxy groups.

3. Method as claimed in claim 1 wherein said ester is a diester of phosphoric acid esterified with an ethoxylated nonylphenol containing from about six to 10 ethoxy groups.

4. Method as claimed in claim 1 wherein said ester is a monoester of phosphoric acid esterified with an ethoxylated $C_{12}$—$C_{18}$ alkanol containing from about 6 to 10 ethoxy groups.

5. Method as claimed in claim 1 wherein said ester is a diester of phosphoric acid esterified with an ethoxylated $C_{12}$—$C_{18}$ alkanol containing from about six to 10 ethoxy groups.

6. Method as claimed in claim 1 wherein said ester is an admixture of a monoester and a diester of phosphoric acid esterified with an ethoxylated nonylphenol containing from six to 10 ethoxy groups.

7. Method as claimed in claim 1 wherein said ester consists essentially of a mixture of a monoester and a diester of phosphoric acid esterified with an ethoxylated $C_{12}$—$C_{18}$ alkanol containing from about six to 10 ethoxy groups.

8. Method as claimed in claim 1 wherein said ester comprises a mixture of 40 to 60 percent by weight of nonylphenoxypolyethoxyethyl phosphate and 60 to 40 percent by weight of di(nonylphenoxypolyethoxyethyl) phosphate, each polyethoxy moiety containing an average of about five ethoxy groups.

9. Method as claimed in claim 1 wherein the said ester is present in a concentration of from about 0.3 to about 1.5 percent by weight.

10. Method as claimed in claim 1 wherein the said acid is hydrochloric acid.

11. Method as claimed in claim 1 wherein the said acid is sulfuric acid.

12. Method as claimed in claim 1 wherein the said ester is dissolved in about 5 to about 20 percent by weight solution of the mineral acid.

13. Method as claimed in claim 1 wherein the said acid is about 5 to about 28 percent by weight hydrochloric acid and the said ester is present in an amount of from about 0.3 to about 1.5 percent by weight, based on the total weight of the composition.

14. Method as claimed in claim 1 wherein the said formation is a hydrocarbon-bearing formation.

15. Method as claimed in claim 1 wherein the said aqueous solution is injected down the well bore penetrating said formation under a pressure greater than the formation pressure and sufficient to create fractures in the formation.

16. Method as claimed in claim 1 wherein the said aqueous solution is injected down the well bore penetrating said formation under a pressure greater than the formation pressure but less than the pressure required to create fractures in the formation.

* * * * *